United States Patent
Prillieux et al.

[11] 3,799,263
[45] Mar. 26, 1974

[54] ENHANCING THE RECOVERY OF OIL FROM SUBTERRANEAN FORMATIONS

[75] Inventors: Marcel Prillieux, Aignan; Robert Tirtiaux, Rouen, both of France

[73] Assignee: Esso Production Research Company, Houston, Tex.

[22] Filed: July 12, 1972

[21] Appl. No.: 271,075

[30] Foreign Application Priority Data
July 15, 1971  France............................71.25817

[52] U.S. Cl.............................. 166/275, 252/8.55 D
[51] Int. Cl............................................ E21b 43/22
[58] Field of Search.................... 166/275, 274, 273; 252/8.55 D

[56] References Cited
UNITED STATES PATENTS

| | | | |
|---|---|---|---|
| 3,302,713 | 2/1967 | Ahearn et al. | 166/274 |
| 2,808,109 | 10/1957 | Kirk | 166/275 |
| 2,839,466 | 6/1958 | Shock et al. | 166/275 |
| 3,348,611 | 10/1967 | Reisberg | 166/274 X |
| 3,373,808 | 3/1968 | Patton | 166/275 |
| 3,663,477 | 5/1972 | Ahearn | 166/274 X |
| 3,698,479 | 10/1972 | Askew et al. | 166/274 X |
| 3,697,424 | 10/1972 | Holm | 166/274 X |

*Primary Examiner*—Stephen J. Novosad
*Attorney, Agent, or Firm*—Lewis H. Eatherton

[57] ABSTRACT

A surfactant for use in secondary and, more preferably, tertiary oil recovery operations, comprising a salt of at least one mono-, di- or tri-alkyl, 1,2-dimethylbenzene sulphonic acid. The alkyl group(s) is or are each $C_{6+}$, preferably $C_9$ to $C_{15}$, most preferably about $C_{10}$ to $C_{13}$, the monoalkyl 1,2-dimethylbenzene sulphonate salts being preferred. The sulphonate salts may be derived from mixtures of sulphonic acids having different chain lengths of alkyl group. Although any water soluble sulphonate of the foregoing type has excellent surfactant properties for secondary and tertiary oil recovery, the preferred cations are derived from diethanolamine and triethanolamine.

15 Claims, 1 Drawing Figure

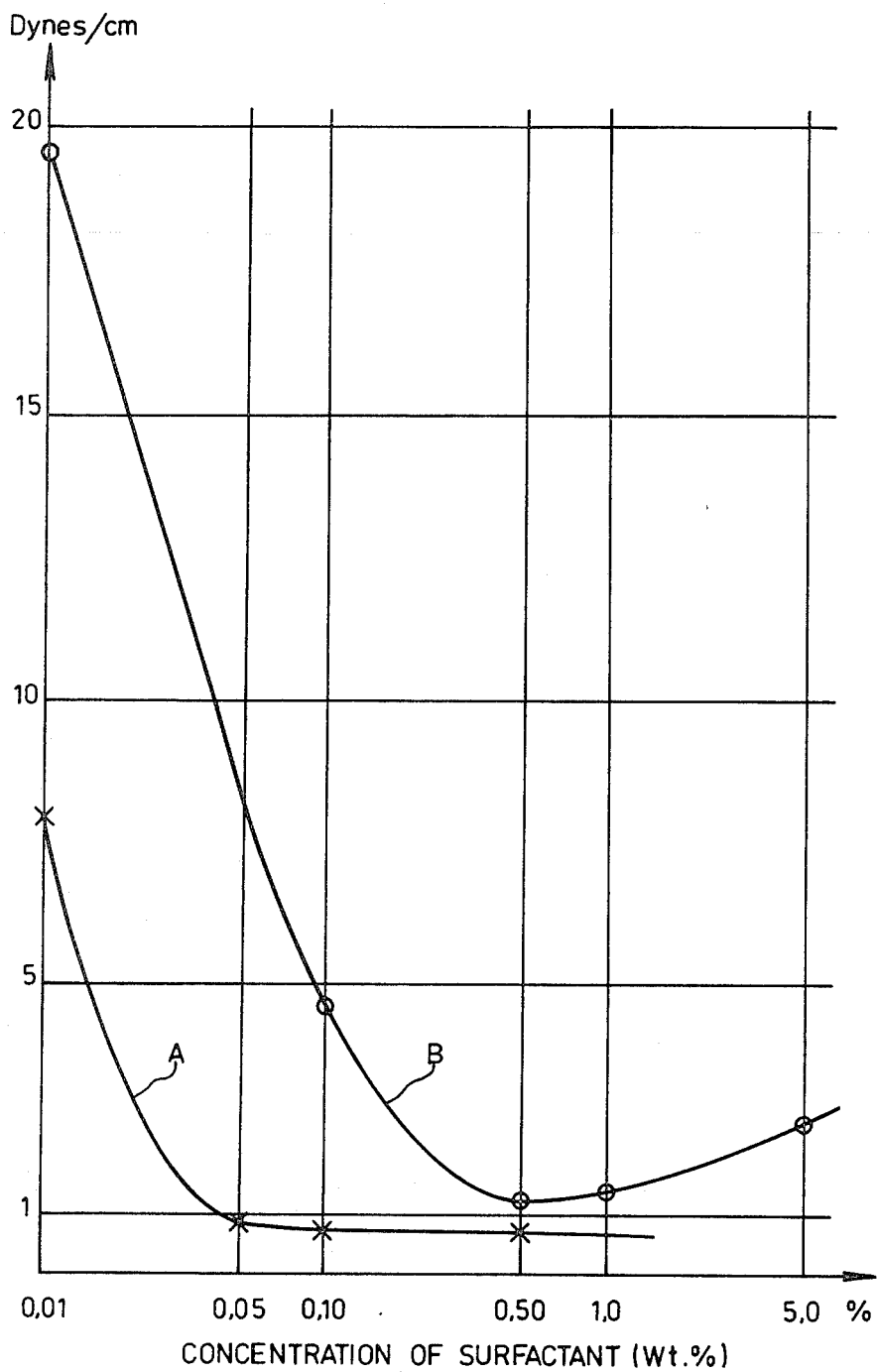

ENHANCING THE RECOVERY OF OIL FROM SUBTERRANEAN FORMATIONS

The present invention relates to enhancing the recovery of oil from subterranean oil-containing formations (including subterranean formations located under water).

It is well known in the art of oil production that only a small proportion of oil can be recovered from oil-bearing formations by direct methods such as the utilization of the natural pressure, if any, of the oil-bearing formation and the use of pumps to raise oil from the formation. These direct methods are termed "primary recovery" techniques. The large proportion of oil which is not recoverable by primary recovery is subjected to so-called secondary recovery techniques in which a stream of a displacement fluid, which may be a gas or liquid (usually water), is injected into the oil-bearing formation or into the vicinity of the formation. Secondary recovery techniques are usually successful in the recovery of part of the oil remaining in the formation after primary recovery becomes uneconomic. However, even after the application of secondary recovery techniques, an appreciable amount of oil is still retained in the formation, and further secondary recovery techniques, sometimes referred to as "tertiary recovery" have been proposed and employed. Among these latter may be mentioned the following:

U.S. Pat. No. 1,651,311 which proposes the use of substances capable of reducing the interfacial tension between water displacement fluid and the retained oil.

U.S. Pat. No. 2,808,109 which suggests specifically the use of a sodium alkylbenzene sulphonate as a surfactant, the said sulphonate having a mean molecular weight of 410 and commercially available under the trade name "Aryl S-38." The sulphonate is proposed to be employed in solution in a water-soluble alcohol.

German patent specification No. 1,192,131 (U.S. priority date 11 Sept. 1961) proposes the use of salts of amine and alkali or alkaline earth metal synthetic sulphonic acids of mean molecular weight between 240 and 317 without any recommendation or consideration of the influence of the distribution of molecular species according to their molecular weights.

U.S. Pat. No. 3,302,713 of Feb. 7, 1967 claims the use for tertiary and recovery of the product that is obtained by treating highly sulphonatable petroleum fractions, which include extracts of phenol, with gaseous $SO_3$, then neutralising direct by soda (NaOH), ammonia or an amine, the sulphonic acids that are formed.

U.S. Pat. No. 3,348,611 claims the use for tertiary oil recovery of a mixture of sodium sulphonates of high mean molecular weight (between 400 and 600) and of low mean molecular weight (300 to 400) in the presence of sodium chloride. The sulphonates can be alkylbenzene sulphonates or natural sulphonates.

In an article entitled "Surfactants for Oil Recovery" by a Mr. G. P. Ahearn, in the "Journal of the American Oil Chemists' Society" for Oct. 1969 (Volume 46), mention is made of the efficacy of a synthetic sodium sulphonate that was successfully used in Texas.

The lowering of the interfacial tension between brine (containing 2 percent by weight of NaCl) and crude petroleum is regarded by experts as an essential test for determining the efficacy of a surface-active additive that is intended for the recovery of the crude petroleum, and particularly the amount of surfactant required to reduce the interfacial tension between brine and oil from 33 dynes/cm to 1 dyne/cm.

It has now been discovered that oil recovery is enhanced by the use of a particular class of polyalkylbenzene sulphonate salts in aqueous solution, and according to the present invention, there is employed an aqueous solution of at least one salt of a base, which may be a base-acting metal compound, ammonium, amine or organic compound, and at least one polyalkylbenzene sulphonic acid selected from monoalkyl-1,2-dimethylbenzene sulphonic acid, dialkyl-1,2-dimethylbenzene sulphonic acid and trialkyl-1,2-dimethylbenzene sulphonic acid and mixtures of the foregoing sulphonic acids, the alkyl group or groups of the said sulphonic acids having at least six carbon atoms, preferably nine to 15 carbon atoms and predominantly 10 to 13 carbon atoms.

The alkylsulphonate salts may be a mixture of salts of different alkylsulphonic acids - i.e. if the sulphonates are mainly derived from monoalkyl-1,2-dimethylbenzene sulphonic acid, the alkyl groups in different molecules may have different chain lengths.

The sulphonic acid(s) are preferably prepared by alkylation of ortho-xylene in the presence of a suitable alkylation catalyst, followed by sulphonation. The ortho-xylene may be pure, or may be contained in a mixture of other hydrocarbons, such as hexane. The preferred alkylating agents are $C_{6+}$ oligomers of one or more olefins, i.e. homo- or hetero-oligomers of $C_2$ to $C_6$ olefins. Such oligomers may be prepared by methods which are well-known in the art, and which include oligomerization of the selected olefin or olefin mixture in the presence of a suitable catalyst such as phosphoric acid/kieselguhr; boron trifluoride, nickel oxide or sulphuric acid. The desired oligomer is separated by fractional distillation from other products. The most preferred alkylating agent is a propylene tetramer which may be a commercial tetramer fraction. Alkylation with any of the foregoing oligomers gives alkylated ortho-xylene in which the alkyl side chain(s) are branched: the branching in the alkyl side-chain is thought to be advantageous in the utility of the final sulphonate salts.

The alkylation catalysts are preferably weak Lewis acids, such as $AlCl_3$ suitably activated with e.g. HCl. Preferably, the amount of olefin supplied for the reaction is no more than sufficient to produce the monoalkyl orthoxylene, so that after sludge settling and caustic washing, unreacted orthoxylene can be recovered for re-use by distillation, and the alkylate separated also by distillation. The resulting alkylate has the general chemical structure:

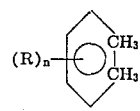

where $(R)_n$ represents one or more identical or different $C_{6+}$ alkyl side chains, $n$ being an integer from 1 to 3.

A typical alkylated ortho-xylene, prepared by alkylating orthoxylene with a propylene tetramer fraction (containing besides $C_{12}$ olefin, $C_{11}$ and $C_{13}$ olefins and traces of other oligomerization products) in the presence of AlCl$_3$ promoted with HCl boiled in the following range:

IBP — 310°C
20 vol.% — 314°
80 vol.% — 322°
90 vol.% — 330°
FBP — 357°

Sulphonation of the separated alkylate may be achieved in any suitable way, but a preferred method is to dissolve the separated alkylate in liquid SO$_2$, optionally in the presence of a substantially non-sulphonatable volatile hydrocarbon, such as hexane and to pass SO$_3$ through the solution. The reaction is exothermic and if the SO$_2$ is allowed to evaporate, adequate temperature control is assured. Thus, at temperatures below −5°C, preferably at about −10°C, sulphonation will proceed with evaporation of SO$_2$: at −10°C, the reaction may be preformed at substantially atmospheric pressure.

The resulting sulphonic acids may be separated either after sludge settling and purification, e.g. by treatment with hot concentrated hydrochloric acid to remove H$_2$SO$_4$, and heating and stripping to remove any volatile hydrocarbon, or by direct neutralization with, e.g. ammonia.

Finally, either by base exchange, or by neutralization, the sulphonate salts for use in the method of the invention are produced. The sulphonate salts may be salts of the alkali metals, alkaline earth metals, ammonia, primary, secondary and tertiary amines including the methyl and ethylamines, aniline, paratoluidine, N-methylaniline and N-dimethylaniline, or organic bases. The preferred salts are those of alkanolamines, and particularly of diethanolamine and triethanolamine: the sulphonate slats of diethanolamine and triethanolamine are substantially wholly compatible with brines, and have been found not to produce any flocculation in the presence of brines. Such flocculation would be greatly disadvantageous during oil recovery operations, for even slight flocculation could obstruct the pores of the oil-bearing formation.

The average molecular weight of the sulphonic acid should be, for preference, about 350 corresponding more or less with a dodecyl-orthoxylene sulphonic acid. In the finished product, it is preferred that about 70 wt.% of the alkyl side chain is $C_{12}$, about 15 wt.% $C_{10}$ and about 15 wt.% $C_{13}$, with only small amounts of $C_9$, $C_{14}$ and $C_{15}$ side chains. In a sample sulphonate of good efficacy prepared by the preferred procedures described above, the following distribution of alkyl chain lengths was found:

| Carbon Atoms in Side Chain | Molecular Weight Distribution |
|---|---|
| $C_{10}$ | 10.6 |
| $C_{11}$ | 16.1 |
| $C_{12}$ | 57.2 |
| $C_{13}$ | 9.6 |
| $C_{14}$ | 3.8 |
| $C_{15}$ | 2.7 |

In carrying out the method of the invention, a solution in water of the chosen alkyl 1,2-dimethylbenzene sulphonate salt is formed and injected down a well penetrating the oil bearing formation. Generally speaking, low concentrations of the sulphonate surfactant are suitable — less than 4 percent, usually less than 2 percent and generally of the order of 0.5 percent to 1.0 percent, giving satisfactory results. Oil may be recovered from the formation during and/or after the injection of the surfactant solution. The oil may be recovered from one well hole and the surfactant injected into the formation from a different well hole.

The invention will now be described with reference to a number of non-limitative examples.

EXAMPLE 1

Orthoxylene was alkylated with an oligomer of propylene, a mixture of olefins whose molecules contained between 10 and 15 carbon atoms. From the alkylate obtained, there was prepared by sulphonation, then neutralising with soda, using the customary suitable procedures, which are well known in the trade, and/or those procedures hereinabove described, a sodium alkylbenzene sulphonate (product A) having an equivalent molecular weight of about 380.

A comparitive test was made for efficacy for lowering the interfacial tension between a crude petroleum and a brine containing 25 percent of its weight of sodium chloride, between the product A and a different sulphonate product (product B) which was used for working an oil well in Texas (see the article by G.P. Ahearn, Journal of American Oil Chemists' Society, page 578A, Oct. 1969).

The appended figure is a diagram which represents the variation of the interfacial tension as a function of the concentration of the product A (curve A) and the product B (curve B), in the brine. On this diagram there has been entered on the abscissa the concentration of the product used as percentage by weight in the brine and on the ordinate has been entered the interfacial tension, measured in dynes/cm.

It will be seen that the use of Product A in a concentration of 0.05 percent in brine makes it possible to obtain an interfacial tension that is very much less than that obtained when using product B in its optimum concentration, which is 10 times as great.

EXAMPLE 2

A product was prepared according to the procedure used in the preparation of product A, outlined in example 1, but the soda was replaced by the chemically equivalent quantity of monoethanolamine (MEA). There was thus obtained MEA alkylbenzene sulphonate (product C), which is derived from the same alkylbenzene sulphonic acid as product A in example 1.

To lower from 33 to 1 dyne the surface tension between the crude petroleum and a brine containing 2 percent sodium chloride, it suffices to incorporate in the latter 0.1 g per litre of product C or 0.5 g per litre of product A.

On the other hand we have seen (example 1) that 5 g per litre of the similar previously know sulphonate product are required (product B) to obtain a similar result.

EXAMPLE 3

There were prepared two alkyl benzene sulphonates of MEA by operating as for the preparation of product C (example 2), but replacing the orthoxylene by benzene and toluene respectively. Products D and E were thus obtained.

0.5 g per litre of products C, D and E were dissolved in brine containing 2 percent sodium chloride, and then the interfacial tension between this brine and different hydrocarbon liquids was measured (benzene, decalin, crude petroleum).

| Product used | Interfacial tension (dynes/cm) | | |
|---|---|---|---|
| | Benzene/brine | Decalin/brine | Crude petroleum/brine |
| C | Less than 1 | Less than 1 | Less than 1 |
| D | 4 | 13 | 6 |
| E | 2 | 13 | 3.5 |

It will be seen that the trialkylated product C is very much more efficacious than products D and E.

EXAMPLE 4

This example is intended for comparing the compatibility of the same alkylbenzene sulphonic acid with brine.

To make this comparison, product A was used, as described briefly in example 1, and there were also prepared other surface-active agents like product A, but in which the soda was replaced by the chemically equivalent quantities of respectively monoethanolamine (MEA), diethanolamine (DEA) and triethanolamine (TEA). The alkylbenzene sulphonates thus obtained therefore only differ in the nature of cation: $Na^+$, $MEA\text{-}H^+$, $DEA\text{-}H^+$ and $TEA\text{-}H^+$.

With each product, a solution was prepared having the following composition:

Surface-active agent — 10 g
Sodium chloride (NaCl) — 20 g
Water q.s.p. — 1,000 ml The solutions thus obtained were allowed to stand for a week and then it was observed that their appearance was as follows: Cation associated in

| alkylbenzene sulphonate | $Na^+$ | $MEA\text{-}H^+$ | $DEA\text{-}H^+$ | $TEA\text{-}H^+$ |
|---|---|---|---|---|
| Appearance of solution | Rather bulky precipitate | Slight precipitate | Homogeneous | Homogeneous |

It will be seen from this that the solutions of surface-active agents for use according to the invention are particularly stable in the presence of sodium chloride, when the base associated with the alkyl benzyl sulphonic acid is an aminoalcohol, more especially diethanolamine or triethanolamine. Although the sodium cationic form was inferior in the foregoing test, this result does not, of course, mean that ionic forms such as the sodium and other alkali metals, and alkaline earth metal forms cannot be used in the invention.

What is claimed is:

1. A method of enhancing recovery of oil from a subterranean oil-containing formation, the method comprising injecting into the formation an aqueous solution containing only one class of surfactant, said surfactant class consisting essentially of the reaction product of a base and orthoxylene sulfonic acid having at least one additional alkyl substituent with at least six carbon atoms, displacing said aqueous solution within said subterranean formation, and recovering oil from said formation.

2. A method according to claim 1 wherein said orthoxylene sulfonic acid has a single additional alkyl substituent.

3. A method according to claim 2 in which said alkyl substituent has from nine to fifteen carbon atoms.

4. A method according to claim 3 in which said alkyl substituent has from ten to thirteen carbon atoms.

5. A method according to claim 2 in which said orthoxylene sulfonic acid is a mixture of acids each having a single additional alkyl substituent with from six to 15 carbon atoms per alkyl substituent.

6. A method according to claim 2 in which a basic compound contains an alkali metal.

7. A method according to claim 6 in which the alkali metal is sodium.

8. A method according to claim 2 in which the alkyl substituent is branched-chain.

9. A method according to claim 2 in which said orthoxylene sulfonic acid is formed by alkylating orthoxylene with an oligomer of at least one olefin and containing at least six carbon atoms in the presence of an alkylation catalyst, separating the alkylated orthoxylene from the reaction product, and sulfonating the separated alkylated orthoxylene.

10. A method according to claim 9 in which the sulfonation is effected by contacting a solution of alkylated orthoxylene in liquid $SO_2$ with $SO_3$ at a temperature below $-5°C$.

11. A method according to claim 9 in which the olefin oligomer is selected from $C_9$ to $C_{15}$ homopolymers and heteropolymers $C_2$ to $C_6$ olefins.

12. A method according to claim 11 in which the olefin oligomer is a propylene tetramer fraction.

13. A method according to claim 2 in which the basic compound is selected from amines and aminoalcohols.

14. A method according to claim 13 in which the aminoalcohol is selected from diethanolamine and triethanolamine.

15. A method according to claim 1 in which the aqueous surfactant solution is injected into the formation by means of one well and oil is recovered from the formation through a second well.

* * * * *